US010878193B2

United States Patent
Kosaka

(10) Patent No.: US 10,878,193 B2
(45) Date of Patent: Dec. 29, 2020

(54) MOBILE DEVICE CAPABLE OF PROVIDING MAINTENANCE INFORMATION TO SOLVE AN ISSUE OCCURRED IN AN IMAGE FORMING APPARATUS, NON-TRANSITORY COMPUTER READABLE RECORDING MEDIUM THAT RECORDS AN INFORMATION PROCESSING PROGRAM EXECUTABLE BY THE MOBILE DEVICE, AND INFORMATION PROCESSING SYSTEM INCLUDING THE MOBILE DEVICE

(71) Applicant: KYOCERA DOCUMENT SOLUTIONS INC., Osaka (JP)

(72) Inventor: Naohiko Kosaka, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 255 days.

(21) Appl. No.: 15/967,717

(22) Filed: May 1, 2018

(65) Prior Publication Data
US 2019/0340234 A1 Nov. 7, 2019

(51) Int. Cl.
*G06F 40/284* (2020.01)
*G06K 9/00* (2006.01)
(Continued)

(52) U.S. Cl.
CPC .......... *G06F 40/284* (2020.01); *G06F 16/217* (2019.01); *G06F 16/3335* (2019.01);
(Continued)

(58) Field of Classification Search
CPC ............. G06F 16/3344; G06F 16/3329; G06F 16/3332; G06F 16/3335; G06F 40/205;
(Continued)

(56) References Cited

U.S. PATENT DOCUMENTS 4,829,423 A * 5/1989 Tennant ............ G06F 16/90332
704/8
5,953,447 A * 9/1999 Jin ........................... G06K 9/52
382/145
(Continued)

FOREIGN PATENT DOCUMENTS

JP 2003-076538 A 3/2003

OTHER PUBLICATIONS

Daniel L. Waltz, "An English Language Question Answering System for a Large Relational Database", Jul. 1978, ACM, Communications of the ACM, vol. 21, Issue 7, pp. 526-539 (Year: 1978).*

Primary Examiner — Eric Yen
(74) Attorney, Agent, or Firm — Li & Cai Intellectual Property (USA) Office

(57) ABSTRACT

An information processing apparatus includes a processor that executes an information processing program to operate as a text obtaining unit that obtains a text indicating an issue occurred in an electronic apparatus, a keyword extracting unit that tokenizes the text, and filters words obtained by tokenizing the text to extract a keyword, a maintenance-information obtaining unit that obtains a maintenance-information-item or a plurality of maintenance-information-items in association with the keyword from a database that stores a plurality of maintenance-information-items, each of the plurality of maintenance-information-item being information about a solution to an issue occurred in the electronic apparatus, and a maintenance-information providing unit that provides the obtained maintenance-information-item or the plurality of obtained maintenance-information-items to a user.

14 Claims, 9 Drawing Sheets

(51) Int. Cl.
*H04N 1/00* (2006.01)
*G06F 16/21* (2019.01)
*G06F 16/33* (2019.01)
*G06F 40/253* (2020.01)
*G06F 40/268* (2020.01)
*G06F 40/211* (2020.01)

(52) U.S. Cl.
CPC ........ *G06F 16/3344* (2019.01); *G06F 40/211* (2020.01); *G06F 40/253* (2020.01); *G06F 40/268* (2020.01); *G06K 9/00577* (2013.01); *G06K 9/00664* (2013.01); *H04N 1/00251* (2013.01); *H04N 1/00307* (2013.01); *H04N 1/00344* (2013.01); *H04N 2201/0094* (2013.01)

(58) Field of Classification Search
CPC .... G06F 40/211; G06F 40/268; G06F 16/217; G06F 40/284; G06K 9/00577; G06K 9/00624; G06K 9/00664; H04N 1/00344; H04N 1/00251; H04N 1/00307; H04N 2201/0094
See application file for complete search history.

(56) References Cited

U.S. PATENT DOCUMENTS

| | | | |
|---|---|---|---|
| 7,333,864 B1* | 2/2008 | Herley | H04H 60/58 700/94 |
| 8,280,888 B1* | 10/2012 | Bierner | G06F 40/284 707/738 |
| 8,392,431 B1* | 3/2013 | Agassy | G06F 16/9535 707/748 |
| 8,719,244 B1* | 5/2014 | Pasca | G06F 16/951 707/706 |
| 8,793,120 B1* | 7/2014 | Fliedner | G06F 40/268 704/9 |
| 9,141,665 B1* | 9/2015 | Munro | G06F 16/2453 |
| 9,824,453 B1* | 11/2017 | Collins | G06Q 40/08 |
| 10,332,508 B1* | 6/2019 | Hoffmeister | G06N 20/10 |
| 10,509,824 B1* | 12/2019 | Brimley | G06F 16/7867 |
| 10,546,001 B1* | 1/2020 | Nguyen | G06F 16/3329 |
| 2001/0037223 A1* | 11/2001 | Beery | G06N 5/02 705/4 |
| 2003/0020942 A1* | 1/2003 | Teres | G06K 15/00 358/1.14 |
| 2004/0049499 A1* | 3/2004 | Nomoto | G06F 16/3329 |
| 2004/0143644 A1* | 7/2004 | Berton | G06F 16/24542 709/217 |
| 2005/0228794 A1* | 10/2005 | Navas | G06F 16/2471 |
| 2006/0184517 A1* | 8/2006 | Anderson | G06F 16/951 |
| 2007/0073683 A1* | 3/2007 | Kobayashi | G06F 16/345 |
| 2007/0203890 A1* | 8/2007 | Sareen | G06F 16/9574 |
| 2008/0147635 A1* | 6/2008 | Im | G06F 16/951 |
| 2009/0063265 A1* | 3/2009 | Nomula | G06Q 30/02 705/14.66 |
| 2009/0077001 A1* | 3/2009 | Macready | G06F 16/2452 706/57 |
| 2010/0057644 A1* | 3/2010 | Barton | G09B 5/00 706/11 |
| 2011/0055699 A1* | 3/2011 | Li | G06F 16/951 715/709 |
| 2012/0130968 A1* | 5/2012 | Mule | G06F 11/0793 707/706 |
| 2013/0275122 A1* | 10/2013 | Park | G06F 40/30 704/9 |
| 2013/0304730 A1* | 11/2013 | Zhou | G06Q 30/02 707/723 |
| 2015/0006519 A1* | 1/2015 | Jain | G06F 40/289 707/723 |
| 2015/0019541 A1* | 1/2015 | Carus | G06F 16/358 707/723 |
| 2015/0159340 A1* | 6/2015 | Kusuma | E02D 29/0233 405/262 |
| 2015/0235132 A1* | 8/2015 | Allen | G06N 5/04 706/11 |
| 2015/0347587 A1* | 12/2015 | Allen | G06F 16/9535 707/725 |
| 2016/0026659 A1* | 1/2016 | Harley | H04W 4/44 707/758 |
| 2016/0292895 A1* | 10/2016 | Billi | G06F 3/04847 |
| 2017/0032038 A1* | 2/2017 | Relkin | G06F 16/951 |
| 2018/0101574 A1* | 4/2018 | Tang | G06F 16/2455 |
| 2018/0144065 A1* | 5/2018 | Yellai | G06F 16/248 |
| 2018/0357733 A1* | 12/2018 | Valder | G06F 16/9535 |
| 2019/0028587 A1* | 1/2019 | Unitt | G06F 16/3329 |
| 2019/0228095 A1* | 7/2019 | Ergun | G06F 16/951 |

* cited by examiner

MOBILE DEVICE CAPABLE OF PROVIDING MAINTENANCE INFORMATION TO SOLVE AN ISSUE OCCURRED IN AN IMAGE FORMING APPARATUS, NON-TRANSITORY COMPUTER READABLE RECORDING MEDIUM THAT RECORDS AN INFORMATION PROCESSING PROGRAM EXECUTABLE BY THE MOBILE DEVICE, AND INFORMATION PROCESSING SYSTEM INCLUDING THE MOBILE DEVICE

BACKGROUND OF THE INVENTION

1. Field of the Invention

The present disclosure relates to an information processing apparatus capable of providing maintenance-information, which is information about a solution to an issue occurred in an electronic apparatus, to a user. The present disclosure further relates to a non-transitory computer readable recording medium that records an information processing program executable by the information processing apparatus. The present disclosure further relates to an information processing system at least including the information processing apparatus and the electronic apparatus.

2. Description of Related Art

It is desirable to provide maintenance-information, which is information about a solution to an issue occurred in an electronic apparatus (for example, image forming apparatus), to a user via an information processing apparatus (mobile device such as smartphone and tablet computer, for example).

SUMMARY OF THE INVENTION

According to an embodiment of the present disclosure, there is provided an information processing apparatus, including:

a processor that executes an information processing program to operate as a text obtaining unit that obtains a text indicating an issue occurred in an electronic apparatus, a keyword extracting unit that tokenizes the text, and filters words obtained by tokenizing the text to extract a keyword, a maintenance-information obtaining unit that obtains a maintenance-information-item or a plurality of maintenance-information-items in association with the keyword from a database that stores a plurality of maintenance-information-items, each of the plurality of maintenance-information-item being information about a solution to an issue occurred in the electronic apparatus, and a maintenance-information providing unit that provides the obtained maintenance-information-item or the plurality of obtained maintenance-information-items to a user.

According to an embodiment of the present disclosure, there is provided a non-transitory computer readable recording medium that records an information processing program executable by a processor of an information processing apparatus, the information processing program causing the processor of the information processing apparatus to operate as a text obtaining unit that obtains a text indicating an issue occurred in an electronic apparatus, a keyword extracting unit that tokenizes the text, and filters words obtained by tokenizing the text to extract a keyword, a maintenance-information obtaining unit that obtains a maintenance-information-item or a plurality of maintenance-information-items in association with the keyword from a database that stores a plurality of maintenance-information-items, each of the plurality of maintenance-information-item being information about a solution to an issue occurred in the electronic apparatus, and a maintenance-information providing unit that provides the obtained maintenance-information-item or the plurality of obtained maintenance-information-items to a user.

According to an embodiment of the present disclosure, there is provided an information processing system, including:

an electronic apparatus; and an information processing apparatus, including a processor that executes an information processing program to operate as a text obtaining unit that obtains a text indicating an issue occurred in the electronic apparatus, a keyword extracting unit that tokenizes the text, and filters words obtained by tokenizing the text to extract a keyword, a maintenance-information obtaining unit that obtains a maintenance-information-item or a plurality of maintenance-information-items in association with the keyword from a database that stores a plurality of maintenance-information-items, each of the plurality of maintenance-information-item being information about a solution to an issue occurred in the electronic apparatus, and a maintenance-information providing unit that provides the obtained maintenance-information-item or the plurality of obtained maintenance-information-items to a user.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, embodiments of the present disclosure will be described with reference to the drawings.

I. First Embodiment

1. Information Processing System

Figure 1:
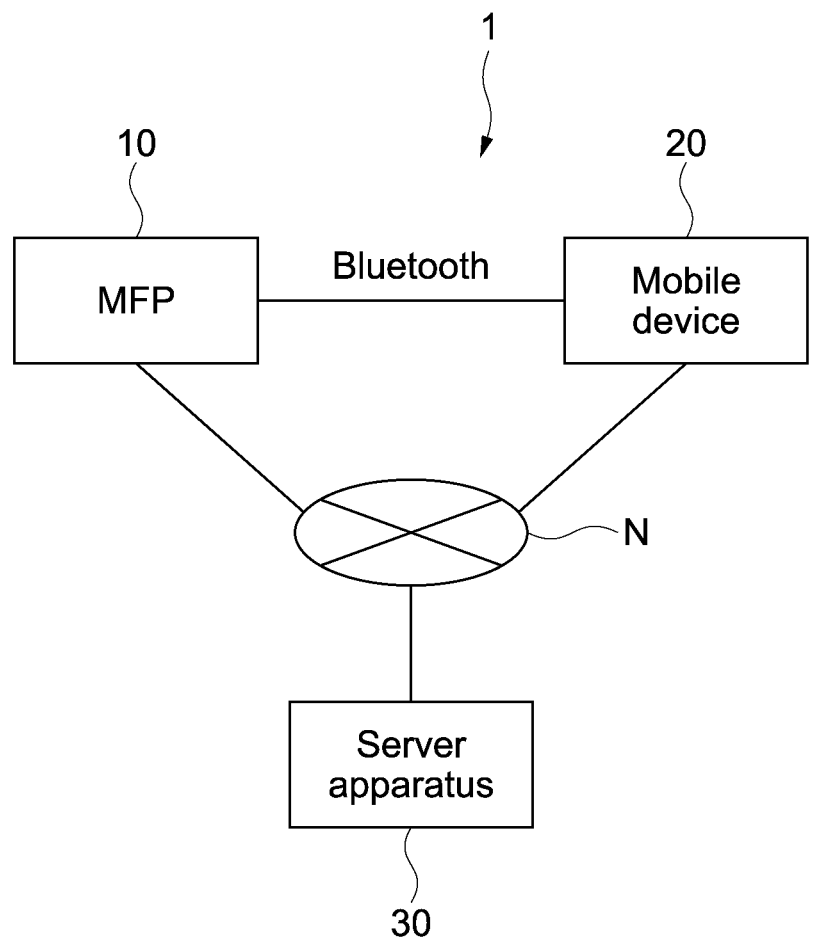
FIG. 1 shows an information processing system of a first embodiment of the present disclosure.

FIG. 1 shows an information processing system of a first embodiment of the present disclosure.

The information processing system 1 includes the electronic apparatus 10, the information processing apparatus 20, and the server apparatus 30.

In the present embodiment, the electronic apparatus 10 is an MFP (Multifunction Peripheral) and will be referred to as the MFP 10 hereinafter. The MFP 10 is in an office, typically.

The information processing apparatus 20 is typically a mobile device such as a smartphone, and will be referred to as the mobile device 20 hereinafter. Typically, the owner of the mobile device 20 is a person in the office in which the MFP 10 is installed.

The MFP 10 is configured to communicate with the mobile device 20 and the server apparatus 30 via the network N such as the Internet and a LAN (Local Area Network) on the basis of HTTPS (Hypertext Transfer Protocol Secure). The MFP 10 is further configured to communicate with the mobile device 20 via near field communication such as Bluetooth (registered trademark).

The server apparatus 30 is configured to communicate with, at least, the mobile device 20 via the network N such as the Internet on the basis of HTTPS.

2. Hardware Configuration of MFP

Figure 2:
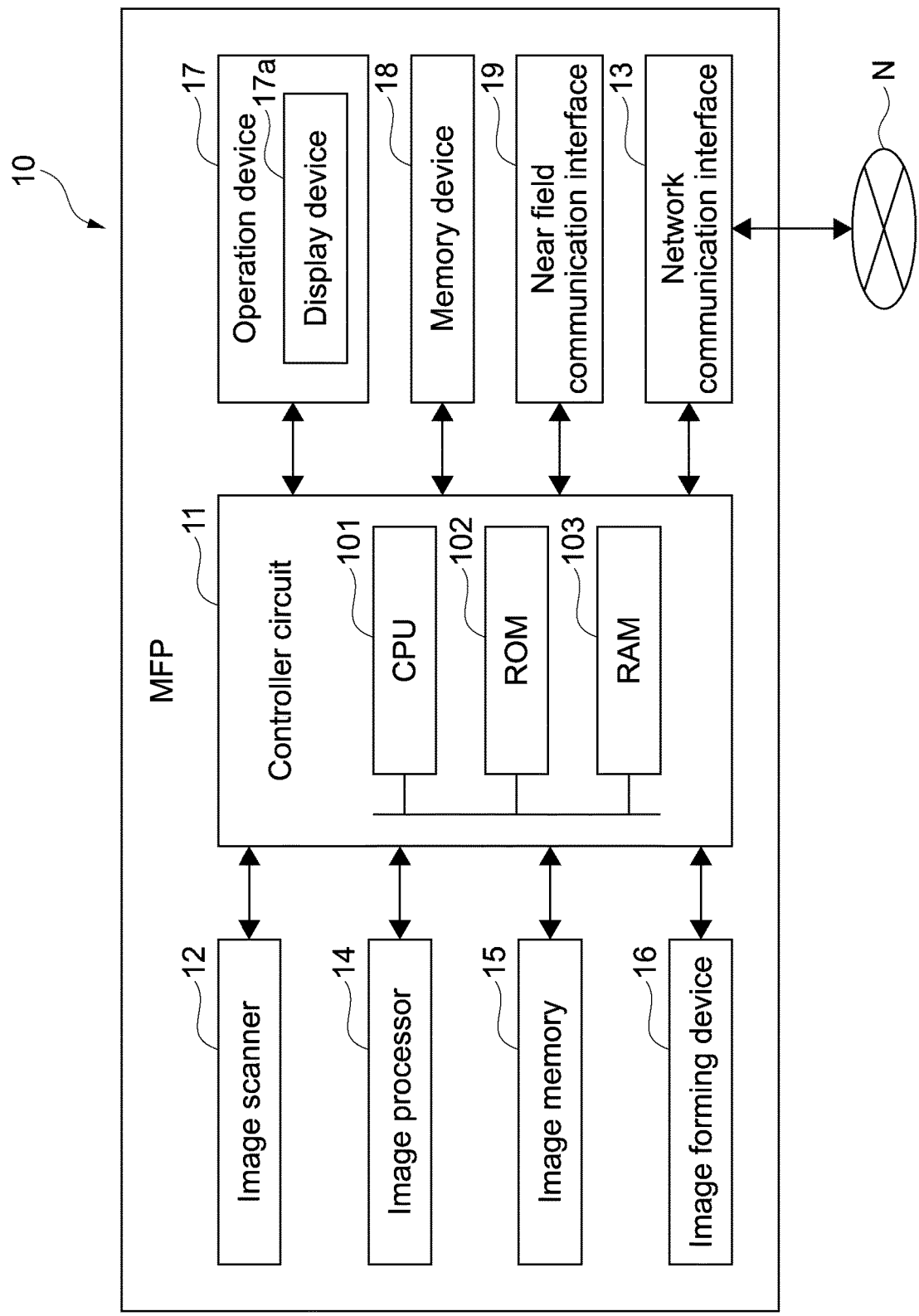
FIG. 2 shows a hardware configuration of the MFP.

FIG. 2 shows a hardware configuration of the MFP.

The MFP 10 includes a controller circuit 11. The controller circuit 11 includes a CPU (Central Processing Unit) 101, a ROM (Read Only Memory) 102, a RAM (Random Access Memory) 103, dedicated hardware circuits, and the like and controls overall operations of the MFP 10.

The controller circuit 11 is connected to an image scanner 12, an image processor 14, an image memory 15, an image forming device 16, an operation device 17, a memory device 18, a network communication interface 13, the near field communication interface 19, and the like. The controller circuit 11 performs operational control of the respective devices connected thereto and sends/receives signals and data to/from those devices.

According to job execution instructions input by a user via the operation device 17 or an electronic apparatus such as the mobile device 20 connected to the network N, the controller circuit 11 controls drive and processing of mechanisms requisite for executing operational control of functions such as an image scanner function, a printing function, and a copy function.

The image scanner 12 captures an image of a document on a platen or a feeder.

The image processor 14 carries out image processing as necessary on image data of an image captured by the image scanner 12. For example, the image processor 14 corrects shading of an image captured by the image scanner 12 and carries out other image processing to improve the quality of the image to be formed.

The image memory 15 includes an area that temporarily stores data of a document image captured by the image scanner 12 or data to be printed by the image forming device 16.

The image forming device 16 forms an image of image data and the like captured by the image scanner 12.

The operation device 17 includes a touch panel device and an operation key device that accept user's instructions on various operations and processing executable by the MFP 10. The touch panel device includes a display device 17a such as an LCD (Liquid Crystal Display) equipped with a touch panel.

The network communication interface 13 is an interface used for connecting to the network N via HTTPS communication.

The memory device 18 is a large-volume storage device such as an HDD (Hard Disk Drive) that stores a document image captured by the image scanner 12, databases (described later), and the like.

The near field communication interface 19 is configured to communicate with the mobile device 20 via near field communication such as Bluetooth (registered trademark).

3. Hardware Configuration of Mobile Device

Figure 3:
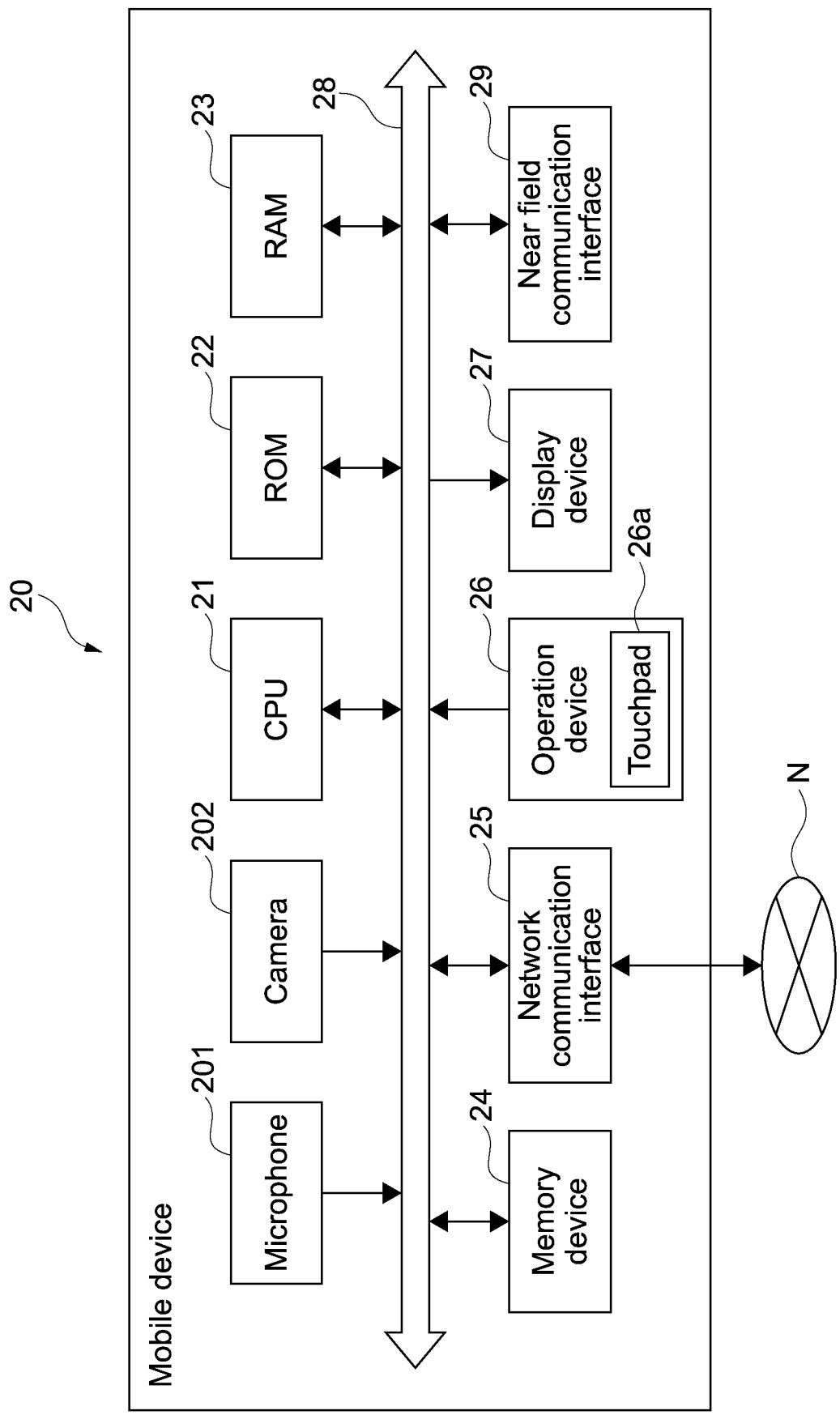
FIG. 3 shows hardware configuration of a mobile device.

FIG. 3 shows hardware configuration of a mobile device.

The mobile device 20 includes the CPU (Central Processing Unit) 21 (processor), the ROM (Read Only Memory) 22, the RAM (Random Access Memory) 23, the memory device 24, the network communication interface 25, the operation devices 26, the display device 27, the near field communication interface 29, the microphone 201, and the camera 202. The mobile device 20 further includes the bus 28 connecting them.

The CPU 21 loads information processing programs, which are stored in the ROM 22, in the RAM 23 and executes the information processing programs. The ROM 22 is a nonvolatile memory, and stores the programs that the CPU 21 executes, data, and the like. The ROM 22 is an example of a non-transitory computer readable recording medium.

The memory devices 24 include a large-volume storage medium such as an HDD (Hard Disk Drive) and an SSD (Solid State Drive) and an external storage medium such as a USB (Universal Serial Bus) memory.

The communication interface 25 is an interface configured to connect to the network N. The network communication interface 25 is configured to communicate with the MFP 10 via the network N on the basis of HTTPS.

The operation devices 26 include a touchpad 26a and various switches. The operation devices 26 detect operations input by a user and output signals based on the detected operations to the CPU 21.

The display device 27 of the touchpad 26a includes an LCD, an organic EL display, or the like. The display device 27 executes calculation processing on the basis of information received from the CPU 21, and displays images on the display on the basis of generated image signals.

The near field communication interface 29 is configured to communicate with the MFP 10 via near field communication such as Bluetooth (registered trademark).

A user's voice is input in the microphone 201.

The camera 202 takes an image of an object to thereby obtain the image.

4. Hardware Configuration of Server Apparatus

Figure 4:
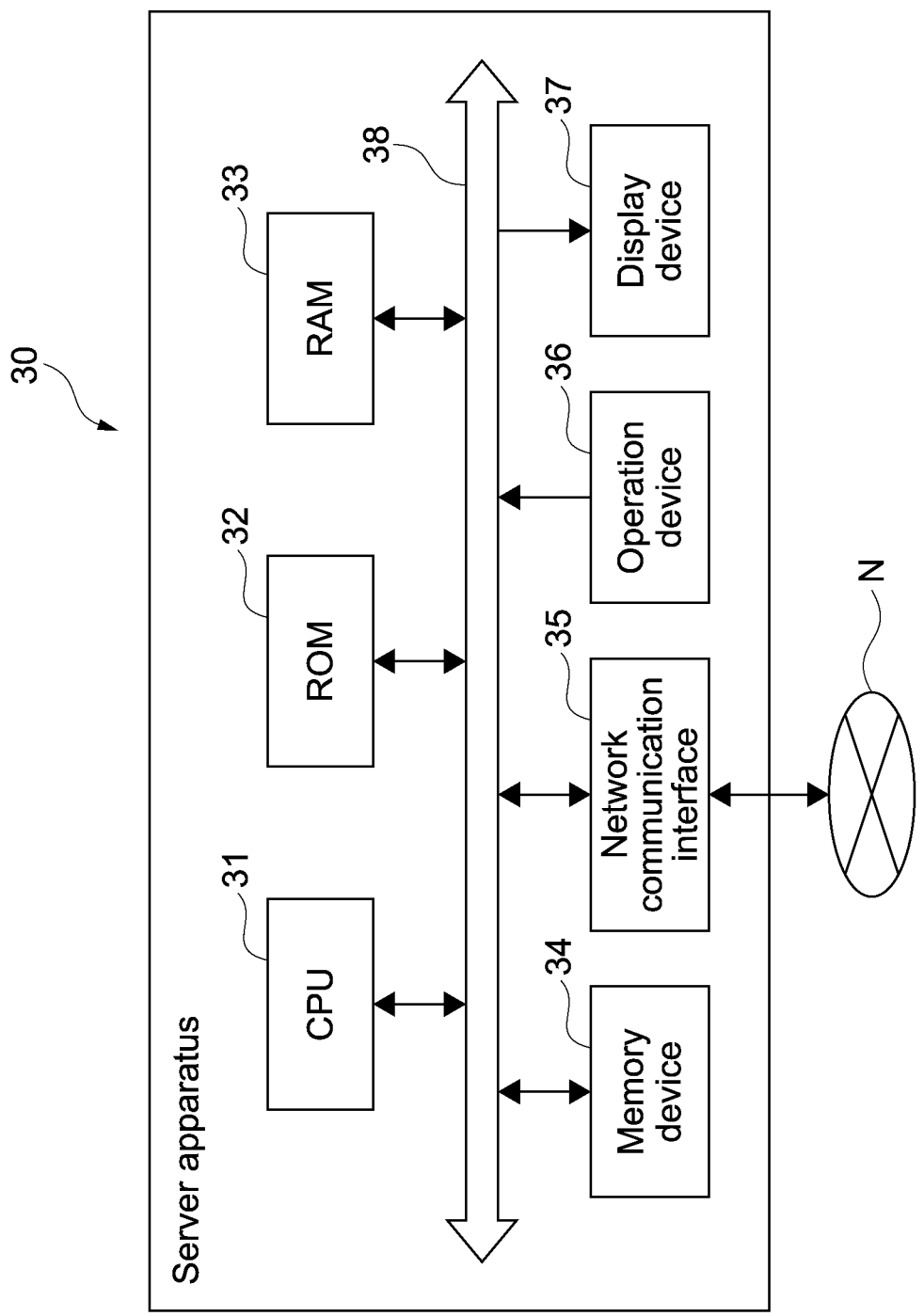
FIG. 4 shows hardware configuration of a server apparatus.

FIG. 4 shows hardware configuration of a server apparatus.

The server apparatus 30 includes the CPU (Central Processing Unit) 31 (processor), the ROM (Read Only Memory) 32, the RAM (Random Access Memory) 33, the memory device 34, the network communication interface 35, the operation devices 36, and the display device 37. The server apparatus 30 further includes the bus 38 connecting them.

The CPU 31 loads information processing programs, which are stored in the ROM 32, in the RAM 33 and executes the information processing programs. The ROM 32 is a nonvolatile memory, and stores the programs that the CPU 31 executes, data, and the like. The ROM 32 is an example of a non-transitory computer readable recording medium.

The memory devices 34 include a large-volume storage medium such as an HDD and an SSD and an external storage medium such as a USB memory.

The communication interface 35 is an interface configured to connect to the network N. The network communication interface 35 is configured to communicate with the mobile device 20 via the network N on the basis of HTTPS.

The operation devices 36 include a keyboard, a mouse, and various switches. The operation devices 36 detect operations input by a user (not end user but manager) and output signals based on the detected operations to the CPU 31.

The display device 37 includes an LCD, an organic EL display, or the like. The display device 37 executes calculation processing on the basis of information received from the CPU 31, and displays images on the display on the basis of generated image signals.

5. Functional Configuration of Information Processing Apparatus (Mobile Device)

Figure 5:
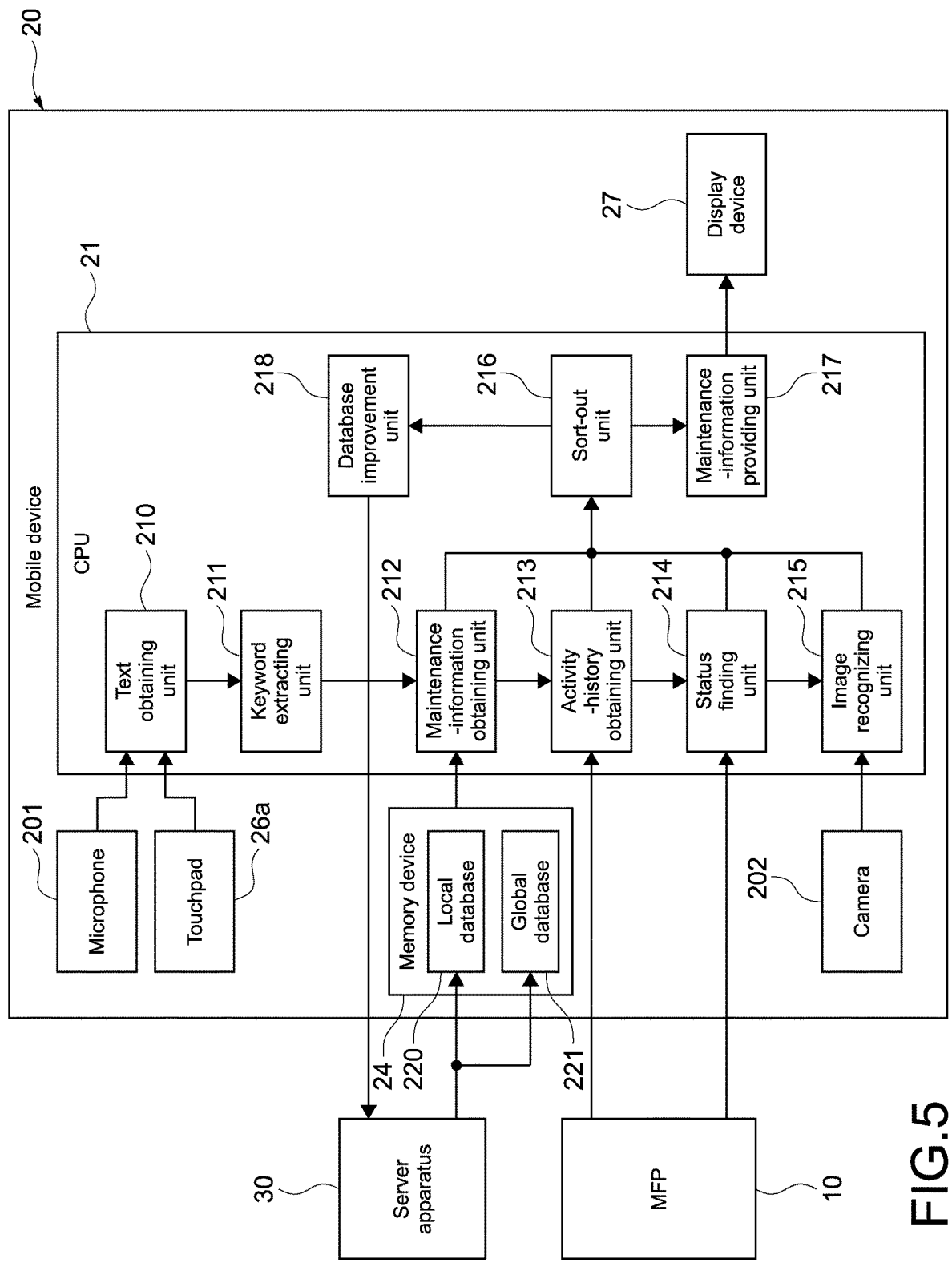
FIG. 5 shows a functional configuration of the information processing apparatus (mobile device)

FIG. 5 shows a functional configuration of the information processing apparatus (mobile device).

The CPU 21 of the mobile device 20 loads an information processing program, which is stored in the ROM 22, in the RAM 23, and executes the information processing program. When the CPU 21 of the mobile device 20 executes the information processing program, the CPU 21 of the mobile device 20 operates as the text obtaining unit 210, the keyword extracting unit 211, the maintenance-information obtaining unit 212, the activity-history obtaining unit 213, the status finding unit 214, the image recognizing unit 215, the sort-out unit 216, the maintenance-information providing unit 217, and the database improvement unit 218.

The text obtaining unit 210 obtains a text indicating an issue occurred in the MFP 10.

The keyword extracting unit 211 tokenizes the text (text indicating an issue occurred in the MFP 10) obtained by the text obtaining unit 210 (morphological analysis). The keyword extracting unit 211 filters the plurality of words obtained by tokenizing the text to thereby extract a noun(s) and a modifier(s) as a keyword(s) (one or plural). In the present embodiment, "modifiers" may at least include words that modify nouns. For example, "modifiers" at least include adjectives.

The maintenance-information obtaining unit 212 searches the local database 220 and the global database 221 stored in the memory device 24, and retrieves a maintenance-information-item(s) (one or plural) in association with the extracted keyword(s). The "maintenance-information-item" is information about a solution to an issue occurred in the MFP 10, and is an entry that links with data that records a method of a solution, for example. Hereinafter, the "maintenance-information-item" will be simply referred to as "entry".

The activity-history obtaining unit 213 receives an activity-history/histories from the MFP 10 via the network communication interface 25 or the near field communication interface 29. The activity-history obtaining unit 213 finds an activity-history/histories in association with the keyword(s) from all the received activity-history/histories.

The status finding unit 214 receives the current-status of the MFP 10 via the network communication interface 25 or the near field communication interface 29. The status finding unit 214 finds an issue on a basis of the current-status received from the MFP 10.

The image recognizing unit 215 recognizes an object(s) of the MFP 10 in an image taken by the camera 202.

The sort-out unit 216 sorts out (in other words, narrows down) an entry/entries (one or plural) having a higher relation with the occurred issue from the entries (plural) retrieved by the maintenance-information obtaining unit 212.

The maintenance-information providing unit 217 provides an entry/entries (one or plural), which is/are obtained by the maintenance-information obtaining unit 212 and sorted out by the sort-out unit 216, to a user.

The database improvement unit 218 sends the provided entry/entries (one or plural) and the keyword to the server apparatus 30, and the server apparatus 30 stores the entry/entries (one or plural) and the keyword(s) in association with each other in the local database 220 and the global database 221.

6. Operation of Information Processing Apparatus

Figure 6:
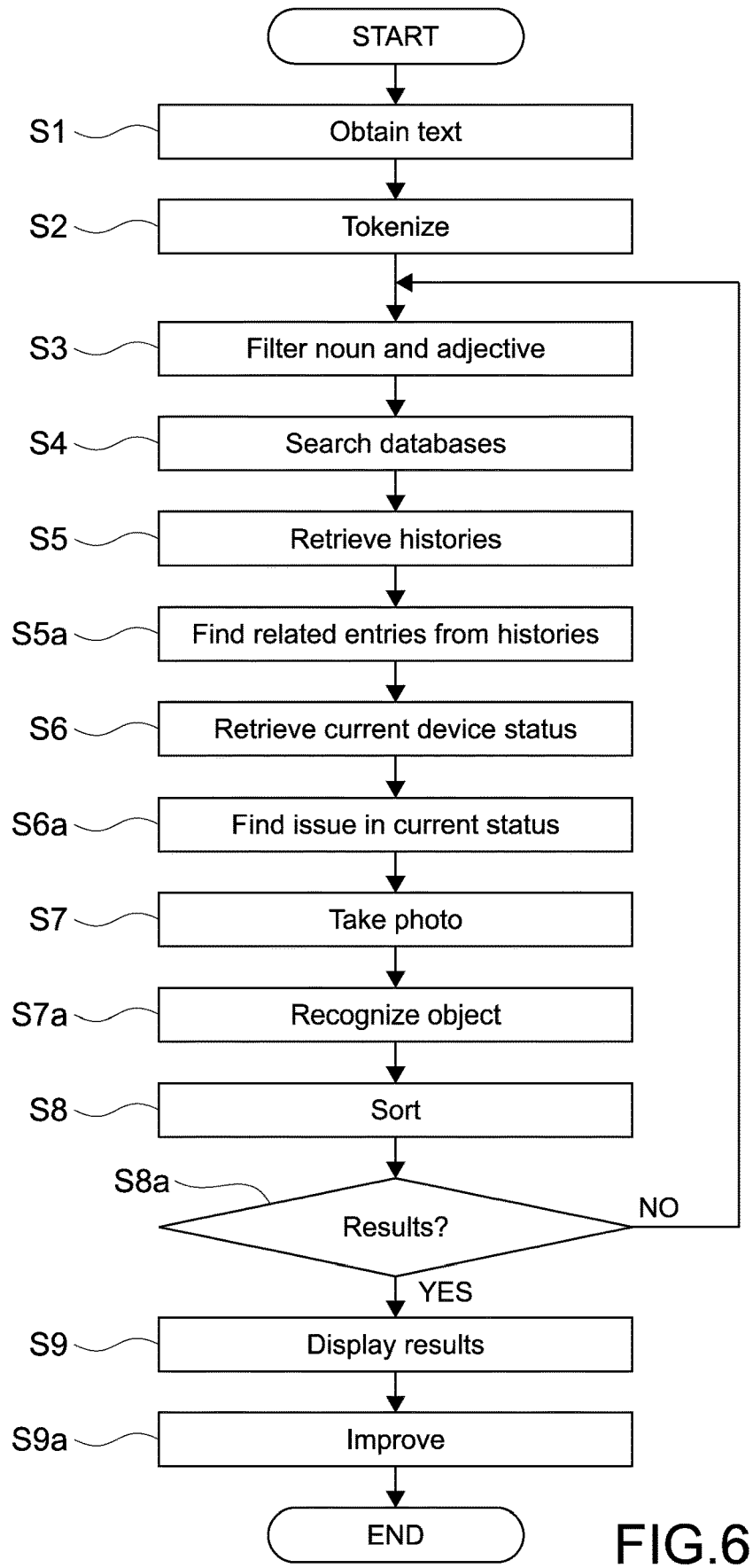
FIG. 6 shows an operational flow of the information processing apparatus (mobile device)

FIG. 6 shows an operational flow of the information processing apparatus (mobile device).

Before starting the flowchart, an issue occurs in the MFP 10 used by a user. The user inputs a voice indicating an issue occurred in the MFP 10 (for example, "Paper jam has occurred", "There is a black spot in scanned document", etc.) in the microphone 201 of the mobile device 20. Alternatively, the user inputs a text indicating an issue occurred in the MFP 10 (same as above) in the touchpad 26a of the mobile device 20.

The text obtaining unit 210 obtains the voice (sound data) input in the microphone 201 and converts the voice (sound data) into a text. Alternatively, the text obtaining unit 210 obtains the text input in the touchpad 26a. In this way, the text obtaining unit 210 obtains a text indicating an issue occurred in the MFP 10 (electronic apparatus) (Step S1).

The keyword extracting unit 211 tokenizes the text (text indicating an issue occurred in the electronic apparatus) obtained by the text obtaining unit 210 (morphological analysis) (Step S2). For example, the keyword extracting unit 211 tokenizes the text "Paper jam has occurred" into a plurality of words "paper", "jam", "has", and "occurred". Alternatively, the keyword extracting unit 211 tokenizes the text "There is a black spot in scanned document" into a plurality of words "there", "is", "a", "black", "spot", "in", "scanned", and "document".

The keyword extracting unit 211 filters the plurality of words obtained by tokenizing the text, and thereby extracts a noun(s) and/or a modifier(s) as a keyword(s) (one or plural) (Step S3). For example, the keyword extracting unit 211 extracts the nouns "paper" and "jam" as keywords from the plurality of words "paper", "jam", "has", and "occurred" obtained by tokenizing the text. Alternatively, the keyword extracting unit 211 extracts the nouns "document" and "spot" and the modifiers "scanned" and "black" as keywords from the plurality of words "there", "is", "a", "black", "spot", "in", "scanned", and "document" obtained by tokenizing the text.

The maintenance-information obtaining unit 212 searches the local database 220 stored in the memory device 24, and retrieves a maintenance-information-item(s) (one or plural) in association with the extracted keyword(s) (Step S4). The "maintenance-information-item" is information about a solution to an issue occurred in the MFP 10, and is an entry that links with data that records a method of a solution, for example. Hereinafter, the "maintenance-information-item" will be simply referred to as "entry". The local database 220 records keywords and entries in association with each other. The local database 220 stores feedbacks obtained from mobile devices owned by users that use MFPs in a limited region (company that has the MFP 10, the sales region of the MFP 10, etc.).

If the maintenance-information obtaining unit 212 retrieves no entry in association with the keyword(s) from the local database 220 (alternatively, if the number of retrieved entry/entries is smaller than a predetermined value), the maintenance-information obtaining unit 212 may search the global database 221 stored in the memory device 24, and may retrieve an entry/entries in association with the keyword(s). Similar to the local database 220, the global database 221 also records keywords and entries in association with each other. The global database 221 stores a wider range of information than information stored in the local database 220. For example, the global database 221 stores feedbacks obtained from mobile devices owned by users that use MFPs in a wider region (all the companies that have MFPs of the same model, all the sales regions of MFPs of the same model, etc.).

Note that the mobile device 20 has downloaded the local database 220 and the global database 221 from the server apparatus 30 via the network N at regular timings or at triggered timings.

Meanwhile, the activity-history obtaining unit 213 receives activity-history/histories from the MFP 10 via the network communication interface 25 or the near field communication interface 29 (Step S5). Examples of "an activity-history/histories" may include a history/histories of services executed by the MFP 10 and/or a diagnostic history/histories for issues occurred. In detail, the activity-history obtaining unit 213 sends a request to the MFP 10, and receives the predetermined number of recent activity-history/histories (one or plural) from the MFP 10. The activity-history obtaining unit 213 finds an activity-history/histories in association with the keyword(s) from all the received activity-history/histories (Step S5a). For example, the activity-history obtaining unit 213 finds an activity-history/histories containing the keyword(s) as an activity-history/histories in association with the keyword(s).

Meanwhile, the status finding unit 214 receives the current-status of the MFP via the network communication interface 25 or the near field communication interface 29 (Step S6). The status finding unit 214 may receive data containing the current-status. Alternatively, the status finding unit 214 may receive image data of a status page, may optically recognize the received image data (OCR, optical character recognition), and may capture a status described in a text. The status may include, for example, an error code, a message, and the like. The status finding unit 214 finds an issue in the current-status received from the MFP 10 (Step S6a).

Meanwhile, the user operates the mobile device 20, and the camera 202 thereby takes an image of an object, in which an issue has occurred, of the MFP 10 to obtain the image (Step S7). Examples of "an object in which an issue has occurred" may include a feeder (if issue is paper jam) and a platen (if issue is black spot in scanned document). The image recognizing unit 215 recognizes the object of the MFP 10 in the image taken by the camera 202 (Step S7a).

The sort-out unit 216 sorts out (in other words, narrows down) an entry/entries (one or plural) having a higher relation with the occurred issue from the entries (plural) retrieved by the maintenance-information obtaining unit 212 (Step S8). Specific examples of the sort-out methods (1) to (4) will be described below.

(1) The sort-out unit 216 may sort out an entry/entries (one or plural) on a basis of registration date(s) of entry/entries, occurrence of the keyword(s) (number of feedbacks obtained from mobile devices), and/or occurrence of the issues in association with the entry/entries. For example, the sort-out unit 216 may sort out an entry/entries (one or plural) whose registration date(s) is/are newer, whose occurrence of the keyword(s) (number of feedbacks obtained from mobile devices) is higher, and/or whose occurrence of the issues in association with the entry/entries is higher.

(2) The sort-out unit 216 may sort out an entry/entries (one or plural) having a higher relation with the activity-history/histories (Step S5a) obtained by the activity-history obtaining unit 213 from the entries (plural) retrieved by the maintenance-information obtaining unit 212. For example, the sort-out unit 216 may sort out an entry/entries (one or plural) having a higher relation with the activity-history/histories of the new (recent) date(s).

(3) The sort-out unit 216 may sort out an entry/entries (one or plural) having a higher relation with the issue (Step S6a) found by the status finding unit 214 from the entries (plural) retrieved by the maintenance-information obtaining unit 212. For example, the sort-out unit 216 may sort out an entry/entries (one or plural) for a solution(s) to the issue found by the status finding unit 214.

(4) The sort-out unit 216 may sort out an entry/entries (one or plural) having a higher relation with the object (Step S7a) recognized by the image recognizing unit 215 from the entries (plural) retrieved by the maintenance-information obtaining unit 212. For example, if the object is a feeder, the sort-out unit 216 may sort out an entry/entries (one or plural) for a solution(s) to an issue(s) (paper jam, etc.) that can occur in the feeder. Alternatively, if the object is a platen, the sort-out unit 216 may sort out an entry/entries (one or plural) for a solution(s) to an issue(s) (black spot in scanned document, etc.) that can occur in the platen.

The sort-out unit 216 may execute all the aforementioned four sort-out methods (1) to (4), any three of those, any two of those, or any one of those. For example, if a user does not operate the mobile device 20 and the camera 202 thus does not take an image of an object to obtain no image (Step S7), the sort-out unit 216 cannot execute the method (4). In this case, the sort-out unit 216 may execute all the three sort-out methods (1) to (3), any two of those, or any one of those.

The sort-out unit 216 may put a higher priority/priorities on one/some of the sort-out methods (1) to (4), and may put a lower priority/priorities on the other(s). For example, the sort-out unit 216 may put the highest priority on the sort-out method (1), the second-highest priority on the sort-out method (2), the third-highest priority on the sort-out method (3), and the lowest priority on the sort-out method (4).

Note that, if the number of the entries (plural) retrieved by the maintenance-information obtaining unit 212 is a predetermined value or less, the sort-out unit 216 may omit the sort-out process (Step S8).

The maintenance-information providing unit 217 provides an entry/entries (one or plural), which is/are obtained by the maintenance-information obtaining unit 212 and sorted out by the sort-out unit 216, to the user (Step S9). For example, the maintenance-information providing unit 217 displays the entry/entries (one or plural) on the display device 27 to thereby provide the entry/entries (one or plural) to the user.

The database improvement unit 218 sends the provided entry/entries (one or plural) and the keyword(s) to the server apparatus 30, and the server apparatus 30 stores the entry/entries (one or plural) and the keyword in association with each other in the local database 220 and the global database 221 (Step S9a). The server apparatus 30 configures mapping (linking) between the entry/entries (one or plural) received from the mobile device 20 and the keyword(s) received from the mobile device 20 to thereby improve the local database 220 and the global database 221.

Meanwhile, if the maintenance-information obtaining unit 212 obtains no entry in association with the keyword (Step S8a, NO), the keyword extracting unit 211 may filter the plurality of words obtained by tokenizing the text (Step S2), and may extract a word(s) other than nouns and modifiers as a keyword(s) (one or plural) (Step S3). Then, the processes on and after Step S4 are repeated.

II. Second Embodiment

In the following description, configurations, processes, and the like similar to those described above will be denoted by similar reference symbols and description thereof will be omitted.

The configuration of the information processing system 1 (FIG. 1), the hardware configuration of the MFP 10 (FIG. 2), the hardware configuration of the mobile device 20 (FIG. 3), and the hardware configuration of the server apparatus 30 (FIG. 4) are similar to the configurations of the first embodiment.

In the first embodiment, as described above with reference to FIG. 5 and FIG. 6, the mobile device 20 executes the processes of extracting keyword(s), obtaining maintenance-information-item, and sorting out. To the contrary, in a second embodiment, the mobile device 20 sends necessary information to the server apparatus 30, and the server apparatus 30 executes the processes of extracting keyword(s), obtaining maintenance-information-item, and sorting out. The server apparatus 30 sends a result to the mobile device 20. The mobile device 20 provides the received result to a user. In other words, in the second embodiment, the server apparatus 30 realizes an information processing apparatus of the present disclosure.

1. Functional Configuration of Mobile Device and Information Processing Apparatus (Server Apparatus)

Figure 7:
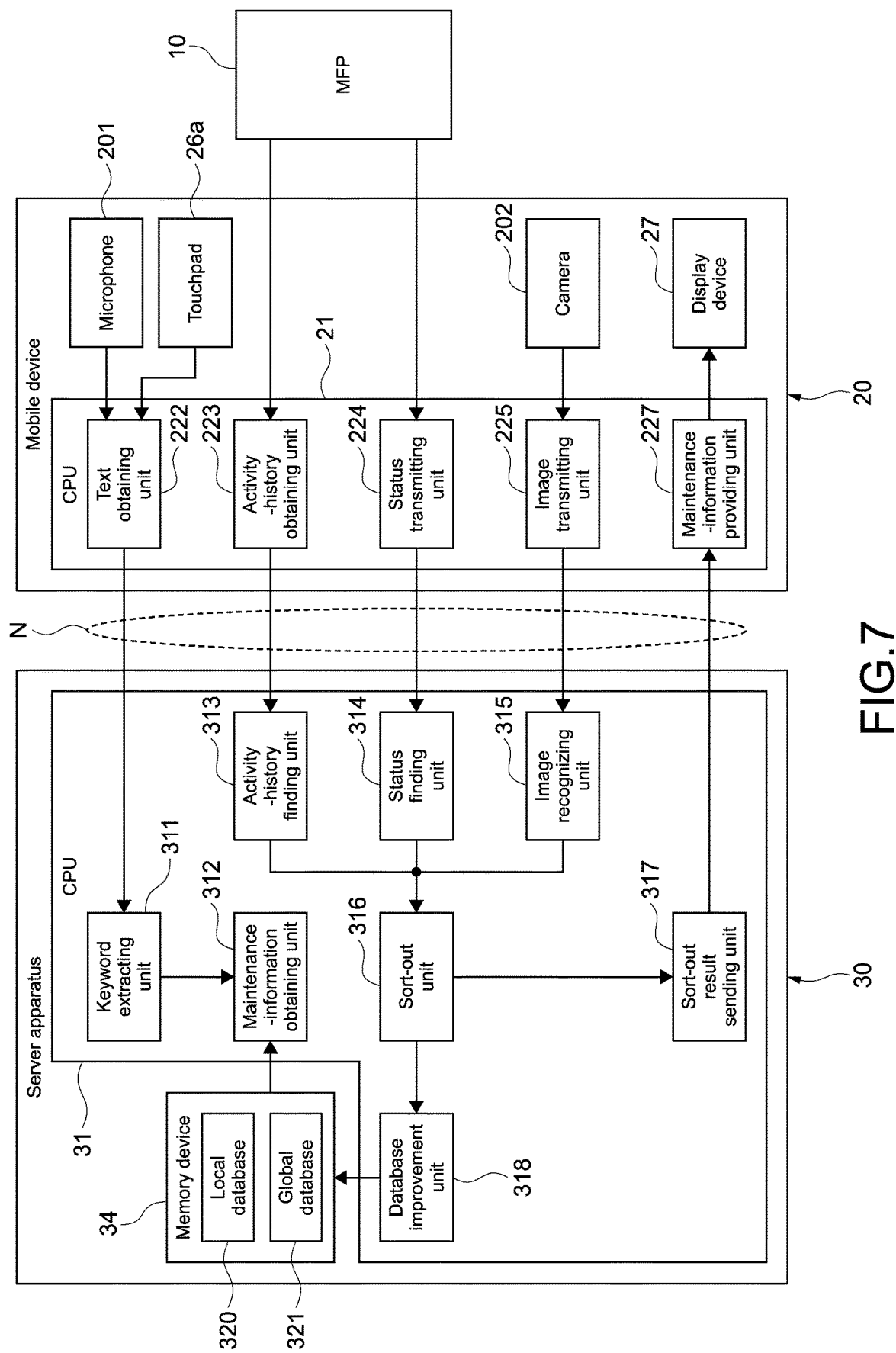
FIG. 7 shows a functional configuration of the mobile device and a functional configuration of the information processing apparatus (server apparatus) of a second embodiment.

FIG. 7 shows a functional configuration of the mobile device and a functional configuration of the information processing apparatus (server apparatus) of a second embodiment.

The CPU 21 of the mobile device 20 loads an information processing program, which is stored in the ROM 22, in the RAM 23, and executes the information processing program. When the CPU 21 of the mobile device 20 executes the information processing program, the CPU 21 of the mobile device 20 operates as the text obtaining unit 222, the activity-history obtaining unit 223, the status transmitting unit 224, the image transmitting unit 225, and the maintenance-information providing unit 227.

The CPU 31 of the server apparatus 30 loads an information processing program, which is stored in the ROM 32, in the RAM 33, and executes the information processing program. When the CPU 31 of the server apparatus 30 executes the information processing program, the CPU 31 of the server apparatus 30 operates as the keyword extracting unit 311, the maintenance-information obtaining unit 312, the activity-history finding unit 313, the status finding unit 314, the image recognizing unit 315, the sort-out unit 316, the sort-out result sending unit 317, and the database improvement unit 318.

The text obtaining unit 222 of the mobile device 20 obtains a text indicating an issue occurred in the MFP 10 (electronic apparatus), and sends the obtained text to the server apparatus 30 via the network N.

The keyword extracting unit 311 of the server apparatus 30 tokenizes the text received from the mobile device 20 (morphological analysis). The keyword extracting unit 311 filters the plurality of words obtained by tokenizing the text to thereby extract a noun(s) and a modifier(s) as a keyword (s) (one or plural).

The maintenance-information obtaining unit 312 of the server apparatus 30 searches the local database 320 and the global database 321 stored in the memory device 34, and retrieves a maintenance-information-item(s) (one or plural) in association with the extracted keyword(s).

The activity-history obtaining unit 223 of the mobile device 20 receives an activity-history/histories (one or plural) from the MFP 10 via the network communication interface 25 or the near field communication interface 29. The activity-history obtaining unit 223 sends the activity-history/histories to the server apparatus 30 via the network N.

The activity-history finding unit 313 of the server apparatus 30 finds an activity-history/histories in association with the keyword(s) from all the activity-history/histories received from the mobile device 20.

The status transmitting unit 224 of the mobile device 20 receives the current-status of the MFP 10 via the network communication interface 25 or the near field communication interface 29. The status transmitting unit 224 of the mobile device sends the current-status to the server apparatus 30 via the network N.

The status finding unit 314 of the server apparatus 30 finds an issue on a basis of the current-status received from the mobile device 20.

The image transmitting unit 225 of the mobile device 20 sends an image taken by the camera 202 to the server apparatus 30 via the network N.

The image recognizing unit 315 of the server apparatus 30 recognizes an object(s) of the MFP 10 in the image received from the mobile device 20.

The sort-out unit 316 of the server apparatus 30 sorts out (in other words, narrows down) an entry/entries (one or plural) having a higher relation with the occurred issue from the entries (plural) retrieved by the maintenance-information obtaining unit 312.

The sort-out result sending unit 317 of the server apparatus 30 sends an entry/entries (one or plural), which is/are obtained by the maintenance-information obtaining unit 312 and sorted out by the sort-out unit 316, to the mobile device 20 via the network N.

The maintenance-information providing unit 227 of the mobile device 20 provides the entry/entries (one or plural) received from the server apparatus 30 to a user.

The database improvement unit 318 of the server apparatus 30 stores the sorted-out entry/entries (one or plural) and the keyword(s) in association with each other in the local database 320 and the global database 321.

2. Operation of Information Processing Apparatus and Server Apparatus

Figure 8:
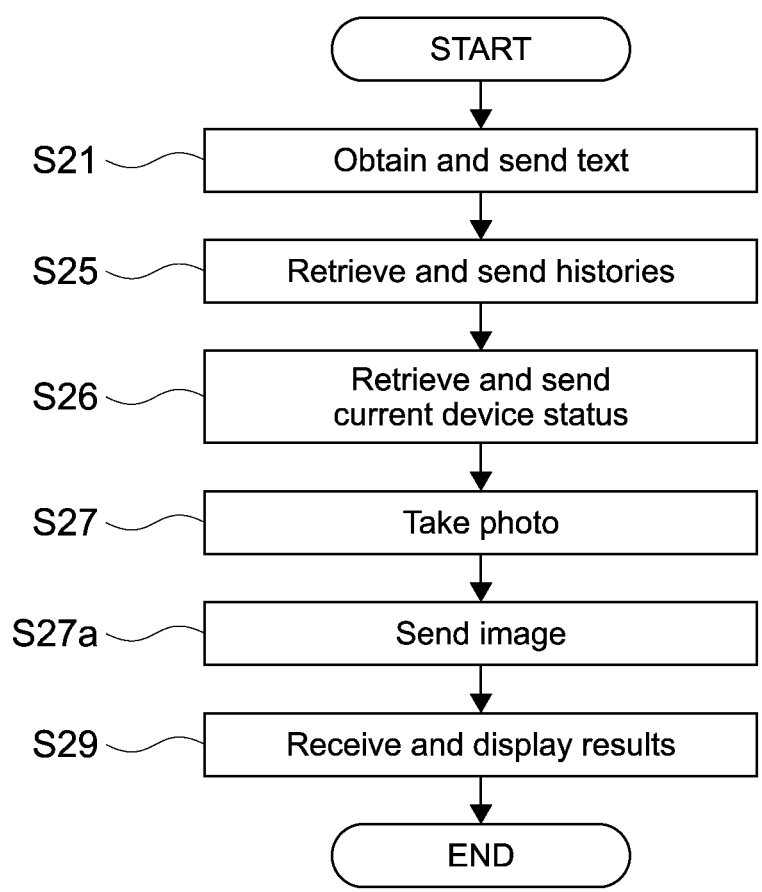
FIG. 8 shows an operational flow of the information processing apparatus (mobile device)
Figure 9:
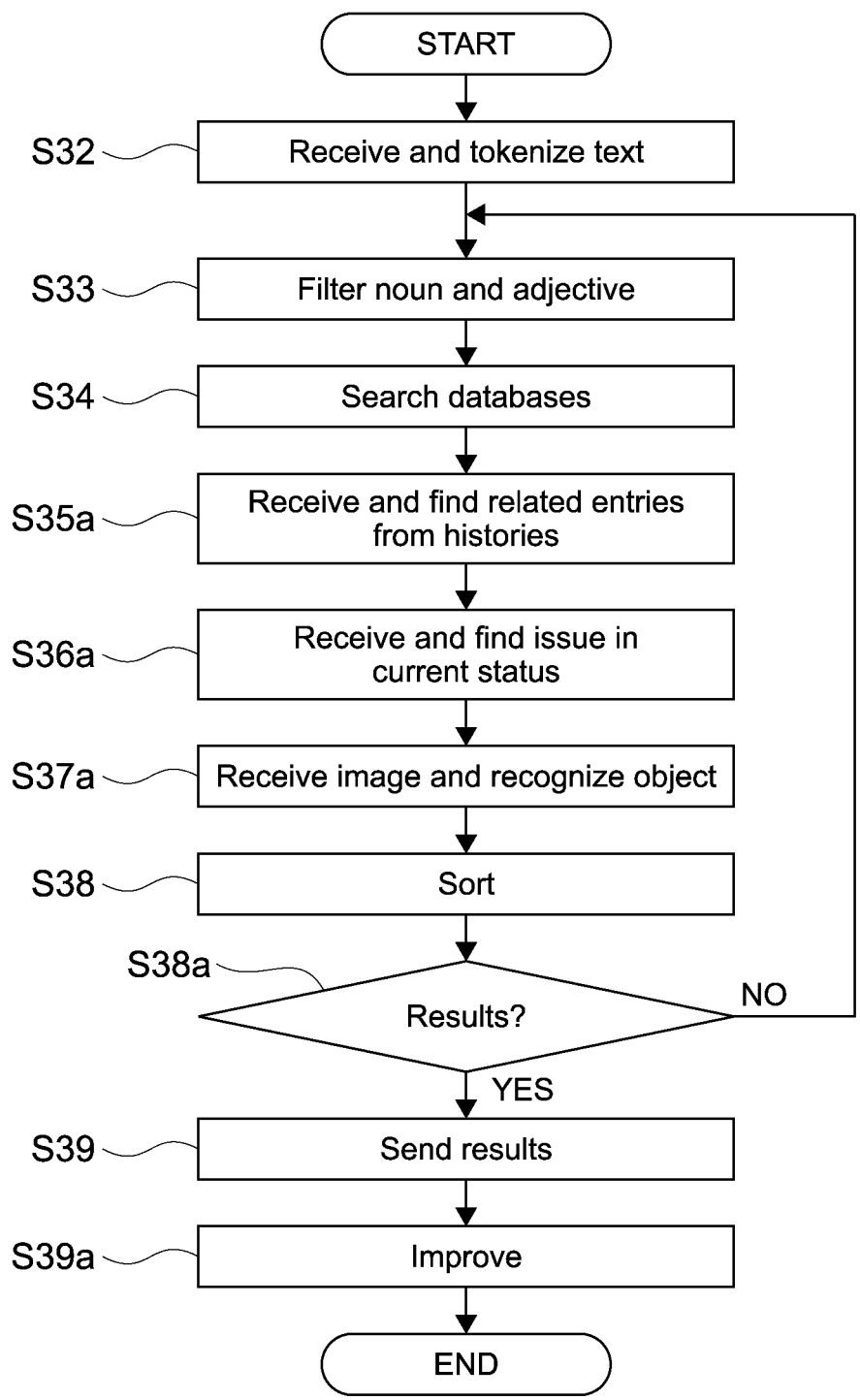
FIG. 9 shows an operational flow of the server apparatus.

FIG. 8 shows an operational flow of the information processing apparatus (mobile device). FIG. 9 shows an operational flow of the server apparatus.

The text obtaining unit 222 of the mobile device 20 obtains a text indicating an issue occurred in the MFP 10 (electronic apparatus). The text obtaining unit 222 of the mobile device 20 sends the obtained text to the server apparatus 30 via the network N (Step S21).

The keyword extracting unit 311 of the server apparatus 30 tokenizes the text received from the mobile device 20 (morphological analysis) (Step S32). The keyword extracting unit 311 filters the plurality of words obtained by tokenizing the text, and thereby extracts a noun(s) and/or a modifier(s) as a keyword(s) (one or plural) (Step S33).

The maintenance-information obtaining unit 312 of the server apparatus 30 searches the local database 320 and the global database 321 stored in the memory device 34, and retrieves a maintenance-information-item(s) (one or plural) in association with the extracted keyword(s) (Step S34).

Meanwhile, the activity-history obtaining unit 223 of the mobile device 20 receives activity-history/histories from the MFP 10 via the network communication interface 25 or the near field communication interface 29. The activity-history obtaining unit 223 of the mobile device 20 sends the activity-history/histories to the server apparatus 30 via the network N (Step S25).

The activity-history finding unit 313 of the server apparatus 30 finds the activity-history/histories in association with the keyword(s) from all the activity-history/histories received from the mobile device 20 (Step S35a).

Meanwhile, the status transmitting unit 224 of the mobile device 20 receives the current-status of the MFP 10 via the network communication interface 25 or the near field communication interface 29. The status transmitting unit 224 of the mobile device 20 sends the current-status to the server apparatus 30 via the network N (Step S26).

The status finding unit 314 of the server apparatus 30 finds an issue in the current-status received from the mobile device 20 (Step S36a).

Meanwhile, the user operates the mobile device 20, and the camera 202 thereby takes an image of an object, in which an issue has occurred, of the MFP 10 to obtain the image (Step S27). The image transmitting unit 225 sends the image taken by the camera 202 to the server apparatus 30 via the network N (Step S27a).

The image recognizing unit 315 of the server apparatus 30 recognizes the object of the MFP 10 in the image received from the mobile device 20 (Step S37a).

The sort-out unit 316 of the server apparatus 30 sorts out (in other words, narrows down) an entry/entries (one or plural) having a higher relation with the occurred issue from the entries (plural) retrieved by the maintenance-information obtaining unit 312 (Step S38).

The sort-out result sending unit 317 of the server apparatus 30 sends the entry/entries (one or plural), which is/are obtained by the maintenance-information obtaining unit 312 and sorted out by the sort-out unit 316, to the mobile device 20 via the network N, in order to provide the entry/entries to the user (Step S39).

The maintenance-information providing unit 227 of the mobile device 20 provides an entry/entries (one or plural) received from the server apparatus 30 to the user (Step S29).

Meanwhile, the database improvement unit 318 of the server apparatus 30 stores the sorted-out entry/entries (one or plural) and the keyword(s) in association with each other in the local database 320 and the global database 321 (Step S39a).

Meanwhile, if the maintenance-information obtaining unit 312 of the server apparatus 30 obtains no entry in association with the keyword(s) (Step S38a, NO), the keyword extracting unit 311 may filter the plurality of words obtained by tokenizing the text (Step S32), and may extract a word(s) other than nouns and modifiers as a keyword(s) (one or plural) (Step S33).

III. Modification Examples

In the first embodiment, the mobile device 20 executes the processes of extracting keyword(s), obtaining maintenance-information-item, and sorting out. To the contrary, in a second embodiment, the mobile device 20 sends necessary information to the server apparatus 30, and the server apparatus 30 executes the processes of extracting keyword(s), obtaining maintenance-information-item, and sorting out. Instead of those embodiments, the mobile device 20 and the server apparatus 30 may share the processes of extracting keyword(s), obtaining maintenance-information-item, and sorting out (not shown).

Alternatively, if the MFP 10 includes all the configuration of the mobile device 20 and the server apparatus 30, the MFP 10 may execute the processes of extracting keyword(s), obtaining maintenance-information-item, and sorting out (not shown).

If there is no result (Step S8a or S38a, NO), the retry process may be executed by using all the following methods (a) to (d), any three of those, any two of those, or any one of those.

(a) Change search keywords. Add a different part of speech to keywords. Automatically generate additional keywords by lemmatization. Reduce number of keywords.

(b) Change database. Use a global database to retrieve information.

(c) Check similar devices. Discover similar devices in the network N and retrieve service or diagnostic records.

(d) Change filtered date. Retrieve record from older date.

IV. Conclusion

According to the present disclosure, there is provided a method of providing a MFP maintenance procedure by using a combination of tokenizing user keyword inputs, checking prior service/diagnostic histories and current device status, and taking a photo of a defective parts, to provide a most relevant solution to the user. Multiple search and filter narrow down the cause.

Too many search results obscures relevant information. By providing only a relevant information reduces amount of time spent to service a device. Filtering unrelated results reduces error by incorrectly applying wrong maintenance procedures. Retrieving service/diagnostic information may reveal hidden or root cause.

It should be understood by those skilled in the art that various modifications, combinations, sub-combinations and alterations may occur depending on design requirements and other factors insofar as they are within the scope of the appended claims or the equivalents thereof

What is claimed is:

1. A mobile device, comprising:
a second communication device that communicates with an image forming apparatus;
a camera that takes an image of an object, in which an issue has occurred, of the image forming apparatus to obtain the image; and
a processor that executes an information processing program to operate as
   a text obtaining unit that obtains a text indicating the issue occurred in the image forming apparatus,
   a keyword extracting unit that tokenizes the text, and filters words obtained by tokenizing the text to extract a keyword,
   a maintenance-information obtaining unit that obtains a maintenance-information-item or a plurality of maintenance-information-items in association with the keyword from a local database or a global database each of which stores a plurality of maintenance-information-items, each of the stored plurality of maintenance-information-items being information about a solution to the issue occurred in the image forming apparatus,
   an activity-history obtaining unit that receives an activity-history in association with the keyword from the image forming apparatus via the second communication device,
   a status finding unit that receives a current-status of the image forming apparatus from the image forming apparatus via the second communication device, and finds the issue occurred in the image forming apparatus on a basis of the received current-status,
   an image recognizing unit that recognizes the object of the image forming apparatus in the image obtained by the camera,
   a sort-out unit that, where the maintenance-information obtaining unit obtains the plurality of maintenance-information-items, sorts out a maintenance-information-item having a higher relation with the issue occurred in the image forming apparatus from the obtained plurality of maintenance-information-items, and
   a maintenance-information providing unit that provides the obtained maintenance-information-item or the sorted-out maintenance-information-item to a user, wherein
the sort-out unit
   (1) sorts out a maintenance-information-item having a newest date, having a highest number of occurrences of the keyword, and/or having a highest number of occurrences of the issue occurred in the image forming apparatus,
   (2) sorts out a maintenance-information-item having a higher relation with the activity-history received by the activity-history obtaining unit,
   (3) sorts out a maintenance-information-item having a higher relation with the issue occurred in the image forming apparatus found by the status finding unit, or
   (4) sorts out a maintenance-information-item having a higher relation with the object recognized by the image recognizing unit from the obtained plurality of maintenance-information-items in an order of priority, where the sort-out methods (1), (2), (3), and (4) have different priorities.

2. The mobile device according to claim 1, wherein
if the maintenance-information obtaining unit obtains no maintenance-information-item in association with the keyword,
the keyword extracting unit executes a retry process by using all, any three of, any two of, or any one of methods (a), (b), (c), and (d) including
(a) a method including changing a keyword, adding a different keyword, automatically generating an additional keyword by lemmatization, and/or reducing a number of keywords,
(b) a method including using the global database instead of the local database to retrieve information,
(c) a method including checking a similar image forming apparatus, discovering a similar image forming apparatus in a network, and/or retrieving a service or a diagnostic record, and
(d) a method including changing filtered date, and/or retrieving record from older date.

3. The mobile device according to claim 1, wherein
the processor further operates as
   a database improvement unit that improves the local database and/or the global database by linking the obtained or sorted-out maintenance-information-item provided to the user and the keyword in association with each other.

4. The mobile device according to claim 1, wherein
where the maintenance-information obtaining unit obtains no maintenance-information-item in association with the keyword from the local database, the maintenance-information obtaining unit obtains a maintenance-information-item or a plurality of maintenance-information-items in association with the keyword from the global database, the global database storing a wider range of information than information stored in the local database, wherein
the local database stores feedbacks obtained from mobile devices owned by users that use image forming apparatuses in a limited region, the limited region including a company that has the image forming apparatus and/or a sales region of the image forming apparatus, and
the global database stores feedbacks obtained from mobile devices owned by users that use image forming apparatuses in a wider region, the wider region including all companies that have image forming apparatuses of a same model and/or sales regions of image forming apparatuses of the same model.

5. The mobile device according to claim 1, wherein
the keyword extracting unit extracts a noun and/or a modifier as the keyword/keywords from a plurality of words obtained by tokenizing the text.

6. The mobile device according to claim 5, wherein
where the maintenance-information obtaining unit obtains no maintenance-information-item in association with the keyword,
the keyword extracting unit re-extracts a word other than the noun and/or the modifier from the plurality of words as the keyword, and
the maintenance-information obtaining unit obtains a maintenance-information-item or a plurality of maintenance-information-items in association with the re-extracted keyword.

7. The mobile device according to claim 6, wherein
the modifier at least includes a word that modifies a noun.

8. The mobile device according to claim 7, wherein
the modifier at least includes an adjective.

9. A non-transitory computer readable recording medium that records an information processing program executable by a mobile device including
- a second communication device that communicates with an image forming apparatus;
- a camera that takes an image of an object, in which an issue has occurred, of the image forming apparatus to obtain the image; and
- a processor,
- the information processing program causing the processor of the mobile device to operate as
- a text obtaining unit that obtains a text indicating the issue occurred in the image forming apparatus,
- a keyword extracting unit that tokenizes the text, and filters words obtained by tokenizing the text to extract a keyword,
- a maintenance-information obtaining unit that obtains a maintenance-information-item or a plurality of maintenance-information-items in association with the keyword from a local database or a global database each of which stores a plurality of maintenance-information-items, each of the stored plurality of maintenance-information-items being information about a solution to the issue occurred in the image forming apparatus,
- an activity-history obtaining unit that receives an activity-history in association with the keyword from the image forming apparatus via the second communication device,
- a status finding unit that receives a current-status of the image forming apparatus from the image forming apparatus via the second communication device, and finds the issue occurred in the image forming apparatus on a basis of the received current-status,
- an image recognizing unit that recognizes the object of the image forming apparatus in the image obtained by the camera,
- a sort-out unit that, where the maintenance-information obtaining unit obtains the plurality of maintenance-information-items, sorts out a maintenance-information-item having a higher relation with the issue occurred in the image forming apparatus from the obtained plurality of maintenance-information-items, and
- a maintenance-information providing unit that provides the obtained maintenance-information-item or the sorted-out maintenance-information-item to a user, wherein
- the sort-out unit
  (1) sorts out a maintenance-information-item having a newest date, having a highest number of occurrences of the keyword, and/or having a highest number of occurrences of the issue occurred in the image forming apparatus,
  (2) sorts out a maintenance-information-item having a higher relation with the activity-history received by the activity-history obtaining unit,
  (3) sorts out a maintenance-information-item having a higher relation with the issue occurred in the image forming apparatus found by the status finding unit, or
  (4) sorts out a maintenance-information-item having a higher relation with the object recognized by the image recognizing unit from the obtained plurality of maintenance-information-items in an order of priority, where the sort-out methods (1), (2), (3), and (4) have different priorities.

10. The non-transitory computer readable recording medium according to claim 9, wherein
if the maintenance-information obtaining unit obtains no maintenance-information-item in association with the keyword,
the keyword extracting unit executes a retry process by using all, any three of, any two of, or any one of methods (a), (b), (c), and (d) including
(a) a method including changing a keyword, adding a different keyword, automatically generating an additional keyword by lemmatization, and/or reducing a number of keywords,
(b) a method including using the global database instead of the local database to retrieve information,
(c) a method including checking a similar image forming apparatus, discovering a similar image forming apparatus in a network, and/or retrieving a service or a diagnostic record, and
(d) a method including changing filtered date, and/or retrieving record from older date.

11. The non-transitory computer readable recording medium according to claim 9, wherein
the information processing program causes the processor of the mobile device to further operate as
a database improvement unit that improves the local database and/or the global database by linking the obtained or sorted-out maintenance-information-item provided to the user and the keyword in association with each other.

12. The non-transitory computer readable recording medium according to claim 9, wherein
where the maintenance-information obtaining unit obtains no maintenance-information-item in association with the keyword from the local database, the maintenance-information obtaining unit obtains a maintenance-information-item or a plurality of maintenance-information-items in association with the keyword from the global database, the global database storing a wider range of information than information stored in the local database, wherein
the local database stores feedbacks obtained from mobile devices owned by users that use image forming apparatuses in a limited region, the limited region including a company that has the image forming apparatus and/or a sales region of the image forming apparatus, and
the global database stores feedbacks obtained from mobile devices owned by users that use image forming apparatuses in a wider region, the wider region including all companies that have image forming apparatuses of a same model and/or sales regions of image forming apparatuses of the same model.

13. The non-transitory computer readable recording medium according to claim 9, wherein
the keyword extracting unit extracts a noun and/or a modifier as the keyword/keywords from a plurality of words obtained by tokenizing the text.

14. An information processing system, comprising:
an image forming apparatus; and
a mobile device, including
a second communication device that communicates with the image forming apparatus;
a camera that takes an image of an object, in which an issue has occurred, of the image forming apparatus to obtain the image; and a processor that executes an information processing program to operate as
- a text obtaining unit that obtains a text indicating the issue occurred in the image forming apparatus,
- a keyword extracting unit that tokenizes the text, and filters words obtained by tokenizing the text to extract a keyword,
- a maintenance-information obtaining unit that obtains a maintenance-information-item or a plurality of maintenance-information-items in association with the keyword from a local database or a global database each of which stores a plurality of maintenance-information-items, each of the stored plurality of maintenance-information-items being information about a solution to the issue occurred in the image forming apparatus,
- an activity-history obtaining unit that receives an activity-history in association with the keyword from the image forming apparatus via the second communication device,
- a status finding unit that receives a current-status of the image forming apparatus from the image forming apparatus via the second communication device, and finds the issue occurred in the image forming apparatus on a basis of the received current-status,
- an image recognizing unit that recognizes the object of the image forming apparatus in the image obtained by the camera,
- a sort-out unit that, where the maintenance-information obtaining unit obtains the plurality of maintenance-information-items, sorts out a maintenance-information-item having a higher relation with the issue occurred in the image forming apparatus from the obtained plurality of maintenance-information-items, and
- a maintenance-information providing unit that provides the obtained maintenance-information-item or the sorted-out maintenance-information-item to a user, wherein the sort-out unit
- (1) sorts out a maintenance-information-item having a newest date, having a highest number of occurrences of the keyword, and/or having a highest number of occurrences of the issue occurred in the image forming apparatus,
- (2) sorts out a maintenance-information-item having a higher relation with the activity-history received by the activity-history obtaining unit,
- (3) sorts out a maintenance-information-item having a higher relation with the issue occurred in the image forming apparatus found by the status finding unit, or
- (4) sorts out a maintenance-information-item having a higher relation with the object recognized by the image recognizing unit from the obtained plurality of maintenance-information-items in an order of priority, where the sort-out methods (1), (2), (3), and (4) have different priorities.

* * * * *